US007738391B2

(12) United States Patent
Melpignano et al.

(10) Patent No.: US 7,738,391 B2
(45) Date of Patent: Jun. 15, 2010

(54) METHOD AND SYSTEM FOR COMMUNICATING VIDEO DATA IN A PACKET-SWITCHED NETWORK, RELATED NETWORK AND COMPUTER PROGRAM PRODUCT THEREFOR

(75) Inventors: Diego Melpignano, Monza (IT); Stefano Olivieri, Milan (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 1331 days.

(21) Appl. No.: 11/126,063

(22) Filed: May 10, 2005

(65) Prior Publication Data
US 2005/0265383 A1    Dec. 1, 2005

(30) Foreign Application Priority Data
Jun. 1, 2004    (EP)    .................... 04012878

(51) Int. Cl.
*H04J 1/16* (2006.01)
*H04L 12/26* (2006.01)
(52) U.S. Cl. ..................... 370/252
(58) Field of Classification Search ........... None
See application file for complete search history.

(56) References Cited
U.S. PATENT DOCUMENTS

| | | | |
|---|---|---|---|
| 6,154,489 A | 11/2000 | Kleider et al. | |
| 6,275,471 B1 | 8/2001 | Bushmitch et al. | |
| 6,882,637 B1 * | 4/2005 | Le et al. | 370/349 |
| 6,970,476 B1 * | 11/2005 | Jonsson et al. | 370/401 |
| 2002/0054578 A1 | 5/2002 | Zhang et al. | |
| 2002/0146000 A1 | 10/2002 | Jonsson et al. | |
| 2002/0157058 A1 * | 10/2002 | Ariel et al. | 714/774 |

FOREIGN PATENT DOCUMENTS

| | | |
|---|---|---|
| EP | 1 126 716 A1 | 8/2001 |
| EP | 1 180 871 A2 | 2/2002 |
| EP | 1 202 487 A2 | 5/2002 |
| WO | WO03/041424 * | 5/2003 |

OTHER PUBLICATIONS

European Search Report, EP 04 01 2878.
Yu, et al. "A highly efficient, low delay architecture for transporting H.264 video over wireless channel"; Signal Processing: Image Communication; 2004; pp. 369-385; vol. 19; Elsevier; Amsterdam.
Bormann, et al. "Robust Header Compression (ROHC) <draft-ietf-rohc-rtp-06.txt>"; Network Working Group Internet Draft; Nov. 24, 2000; pp. 1-156.

(Continued)

*Primary Examiner*—Raj Jain
(74) *Attorney, Agent, or Firm*—Hogan Lovells US LLP

(57) ABSTRACT

A method for communicating video data on a wireless channel in a packet-switched network includes the steps of operating at a wireless terminal a compression in packets on the video data during a video coding operation, detecting wireless channel conditions and adapting control parameters of the video coding operation to the detected wireless channel conditions. The compression operation is a robust header compression operation and the step of adapting control parameters of said video coding operation is performed in dependence of information about the wireless channel conditions detected on a feedback channel made available in a decompression step associated with the compression operation.

1 Claim, 3 Drawing Sheets

OTHER PUBLICATIONS

Wada, "Selective Recovery of Video Packet Loss Using Error Concealment"; IEEE Journal on Selected Areas in Communications; Jun. 7, 1989; pp. 807-814; No. 5; IEEE Inc.; New York, USA.

Stockhammer, et al. "H.264/AVC in Wireless Environments"; IEEE Transactions on Circuits and Systems For Video Technology; Jul. 7, 2003; pp. 657-673; vol. 13, No. 7; IEEE Inc.; New York, USA.

Girod, et al. "Feedback-Based Error Control for Mobile Video Transmission"; Proceedings of the IEEE; Oct. 1999; pp. 1707-1723; vol. 87, No. 10; IEEE; New York, USA.

Matoba, et al. "A Study on Reducing Transmission Delay in Mobile Video Communication Systems"; IEICE Transactions on Fundamentals of Electronics, Communications and Computer Sciences; Jul. 1997; pp. 1281-1287; vol. E80-A, No. 7; Institute of Electronics Information and Comm. Eng.; Tokyo, Japan.

Wenger, et al. "RTP payload Format for H.264 Video draft-ietf-avt-rtp-h264-06.txt"; Network Working Group Internet Draft; May 2004; pp. 1-60.

* cited by examiner

Fig_1
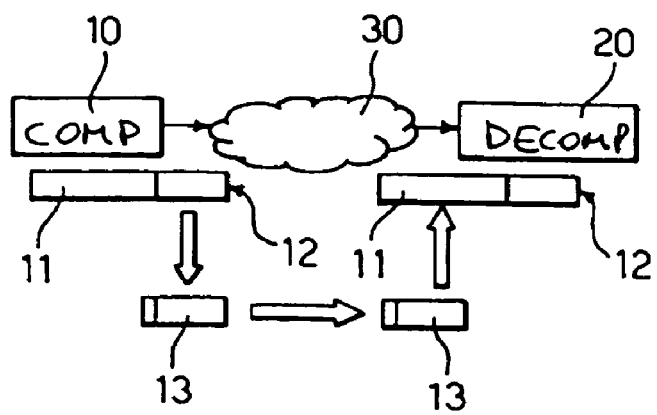
Fig_2
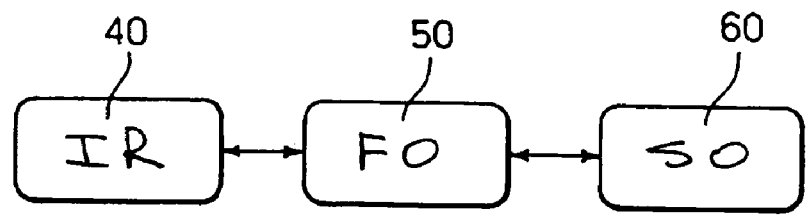
Fig_3
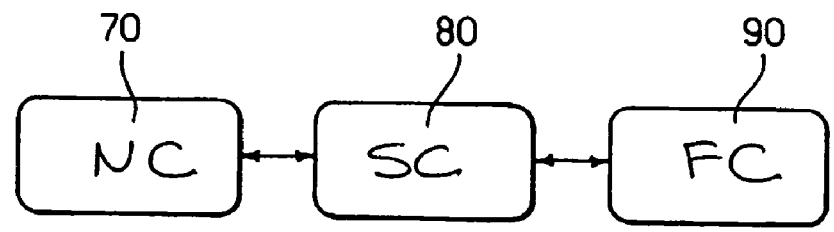

METHOD AND SYSTEM FOR COMMUNICATING VIDEO DATA IN A PACKET-SWITCHED NETWORK, RELATED NETWORK AND COMPUTER PROGRAM PRODUCT THEREFOR

RELATED APPLICATION

The present invention claims priority of European Patent Application No. 04012878.7, which is incorporated herein by this reference in its entirety.

1. FIELD OF THE INVENTION

The present invention relates to communication systems, and was developed by paying specific attention to mobile and wireless video communication systems.

In particular, this invention proposes a new technique for adapting the behavior of a video coder to the channel conditions, especially in the case of a wireless channel.

2. DESCRIPTION OF THE RELATED ART

Nowadays, mobile bi-directional video communication applications use circuit-switched channels and the H.324M protocol stack defined by the International Telecommunication Union (ITU). Static encoding schemes like H.263 with fixed output stream bitrate and coding parameters are used. This solution is not very flexible.

Packet-switched networks, on the contrary, offer a higher degree of flexibility especially when connecting heterogeneous systems (like on the Internet network) at the cost of larger protocol overhead and implementation complexity. The increased overhead is due to packet headers, such a circumstance being particularly undesirable in cellular systems characterized by limited (and costly) bandwidth availability.

The use of packet switched channels and adaptive encoders can provide greater service flexibility, since a mobile terminal can communicate with any host through the Internet network. With suitable arrangements it is also possible to increase channel utilization, efficiency, and video quality.

However, current mobile videoconferencing systems do not exploit information available at different layers of the protocol stack to optimize the quality of the video-call: in this way, if the wireless channel conditions change, video frames may be dropped and errors may corrupt images for quite a long time.

From the end user point of view, UMTS (Universal Mobile Telecommunication System) is a network for services. The end-to-end services are carried over the Universal Mobile Telecommunication System network with bearers, where a bearer is a service providing a given Quality of Service class between two end points.

Universal Mobile Telecommunication System Quality of Service classes, also known as "traffic classes", are defined keeping in mind that the classification must be simple. In particular, from the end user point of view, the impression of the connection quality is very often related to the delay experienced on the connection. For this reason, the connection delay is the main separating attribute between the Universal Mobile Telecommunication System Quality of Service classes, whereas the other factors are guaranteed bit-rate (i.e. bandwidth) and nature of traffic (i.e. symmetric/asymmetric).

Four Quality of Service classes have been defined for Universal Mobile Telecommunication System services:

Conversational class: minimum fixed delay, no buffering, symmetric traffic, guaranteed bit-rate.

Streaming class: minimum variable delay, buffering allowed, asymmetric traffic, guaranteed bit-rate.

Interactive class: moderate variable delay, buffering allowed, asymmetric traffic, no guaranteed bit-rate.

Background class: big variable delay, buffering allowed, asymmetric traffic, no guaranteed bit-rate.

The conversational class is the most demanding Quality of Service class meant for Real Time traffic as, for instance, bi-directional video communication.

In conversational services the end-to-end delay has to be minimized to avoid any perceptual perturbations and to maintain synchronization of audio and video. Therefore, encoding, transmission and decoding of audio and video is performed simultaneously in real time and in both directions.

The mobile environment is characterized by harsh transmission conditions in terms of attenuation, fading, and shadowing, which may result in time-varying channel conditions.

The UMTS network provides many highly sophisticated techniques, such as space-time coding, diversity techniques, interleaving, and Turbo codes, in order to combat errors on the wireless link. However, these advanced tools can provide a negligible radio block error rate only for a relatively large value of tolerated maximum delay, whereas some amount of residual errors has to be tolerated for low-delay applications.

Therefore, a video coding standard has to be error-resilient in order to be applicable for conversational services in the wireless environment.

Another critical aspect concerning wireless video communication is that in general, the available bandwidth (and thus the bit-rate) over the radio link is limited and the costs for the user are expected to be proportional to the number of transmitted bits over the radio link. Thus, low bit-rates are likely to be typical, and compression efficiency is thus an important requirement for a video-coding standard to be successful in a mobile environment.

Third Generation Partnership Project (3GPP) has chosen the RTP/UDP/IP stack, (Realtime Transport Protocol/Unreliable Datagram Protocol/Internet Protocol), for sending real-time or streaming data over Universal Mobile Telecommunication System IP-based Packet-Switched networks.

In this case, the encoded media is encapsulated in the Realtime Transport Protocol/Unreliable Datagram Protocol/Internet Protocol packet with media specific Realtime Transport Protocol payload formats defined by the International Engineering Task Force.

This packet in turn, after header compression, is encapsulated into one Packet Data Convergence Protocol Point-to-Point Protocol (PDCP/PPP) packet, thus becoming a Radio Link Control (RLC) Service Data Unit (SDU).

The Radio Link Control protocol provides segmentation and retransmission services for both users and control data.

It can operate in three modes, namely Transparent Mode (TM), Acknowledged Mode (AM) or Unacknowledged Mode (UM).

In Transparent Mode no protocol overhead is added to higher layer data. Erroneous Packet Data Units (EPDU) can be discarded or marked erroneous.

In the Acknowledged Mode an automatic repeat request mechanism is used for error correction.

Contrarily, Unacknowledged Mode does not use any retransmission protocol, which implies that data delivery is not guaranteed.

Due to time-delay constraints, for bi-directional video communication Third Generation Partnership Project indicates bearers using Unacknowledged Mode Radio Link Control.

The Request For Comments 3550 (Realtime Transport Protocol), described in IETF RFC 3550, "RTP: A Transport Protocol for Real-Time Applications", does not impose a maximum size on Realtime Transport Protocol packets. However, when Realtime Transport Protocol packets are sent over the radio link of a Third Generation Partnership Project Packet Switched system there is an advantage in limiting the maximum size of Realtime Transport Protocol packets both for Acknowledged Mode and Unacknowledged Mode modes of operation.

In Unacknowledged Mode large Realtime Transport Protocol packets are more susceptible to losses over the radio link compared to small Realtime Transport Protocol packets since the loss of a segment may result in the loss of the whole packet.

On the other hand in Acknowledge Mode large Realtime Transport Protocol packets will result in larger delay jitter compared to small packets, as there is a larger chance that more segments have to be retransmitted.

For these reasons, Third Generation Partnership Project recommends that the maximum size of Realtime Transport Protocol packets should be limited in size taking into account the wireless link. This will decrease the Realtime Transport Protocol packet loss rate particularly for Realtime Transport Protocol in Unacknowledged Mode.

For Realtime Transport Protocol in Acknowledged Mode the delay jitter will be reduced permitting the client to use a smaller receiving buffer. It should also be noted that too small Realtime Transport Protocol packets could result in too much overhead, if IP/UDP/RTP (Internet Protocol/Unreliable Datagram Protocol/Realtime Transport Protocol) header compression is not applied, or in unnecessary load at the streaming server.

In the case of transporting video in the payload of Realtime Transport Protocol packets it may happen that a video frame is split into more than one Realtime Transport Protocol packet in order not to produce too large Realtime Transport Protocol packets.

Then, to be able to decode packets following a lost packet in the same video frame, Third Generation Partnership Protocol recommends that synchronization information should be inserted at the start of such Realtime Transport Protocol packets.

For example, for H.263 this implies the use of Group of Blocks (GOBs) with non-empty Group of Blocks headers and in the case of MPEG-4 video the use of video packets (resynchronization markers).

Besides transfer of user data, Packet Data Convergence Protocol performs also the header compression and decompression of IP data streams, e.g. Transport Control Protocol/Internet Protocol (TCP/IP) and Realtime Transport Protocol/Unreliable Datagram Protocol/Internet Protocol headers for Ipv4 and Ipv6, at the transmitting and receiving entity, respectively.

According to the specifications of Third Generation Partnership Protocol TS 25.323 (Rel. 4), "Packet Data Convergence Protocol (PDCP) Specification", two header compression protocol types, i.e. "RFC 2507" and "RFC 3095 (ROHC)" are supported on Universal Mobile Telecommunications System networks.

By utilizing the Packet Identifier (PID) field in the Packet Data Convergence Protocol Packet Data Unit (PDCP/PDU), the Packet Data Convergence Protocol sub-layer is then able to identify the specific header compression protocol and, as far as Robust Header Compression is concerned, to also distinguish different contexts.

Robust Header Compression (ROHC) as standardized by the International Engineering Task Force (IETF) and adopted by the Third Generation Partnership Project (3GPP) starting from Release 4, provides an extensible framework for robust header compression that is designed for IP data flows over wireless channels.

In U.S. Patent Application Publication No. 20020146000 the basic algorithms for Robust Header Compression are presented together with their application to voice-over-IP services.

So far, the Robust Header Compression recommendation has defined four profiles:
  Uncompressed IP packets;
  Realtime Transport Protocol/Unreliable Datagram Protocol/Internet Protocol (RTP/UDP/IP);
  Unreliable Datagram Protocol/Internet Protocol (UDP/IP);
  Encapsulating Security Payload (ESP/IP).

FIG. 1 shows a compressor chain where reference 10 indicates a compressor, operating a Robust Header Compression operation, and 20 indicates a correspondent decompressor, that are comprised in video coders/encoders, not shown as a whole in FIG. 1, separated by a wireless transmission channel.

The Robust Header Compression compressor 10 and decompressor 20 need to maintain context information 30 so that static header fields 11, i.e. those headers that remain unchanged within a given context, are not transmitted at all. Only dynamic fields 12 of the real-time flow are transmitted after suitable encoding in compressed fields 13.

For a Realtime Transport Protocol/Unreliable Datagram Protocol/Internet Protocol flow the dynamic header fields are listed below:
  IPv4 Identification (IP-ID) (16 bits),
  Unreliable Datagram Protocol Checksum (16 bits),
  Realtime Transport Protocol Marker (M-bit) (1 bit),
  Realtime Transport Protocol Sequence Number (SN) (16 bits),
  Realtime Transport Protocol Timestamp (TS) (32 bits).

All the other header fields are either static or inferred, i.e. never change or can be calculated by link layer information, respectively.

FIG. 2 shows the compressor states. Initially the compressor 10 is in a Initialization and Refresh (IR) state 40, where the headers are sent non-compressed so that the decompressor 20 can create a context for the Internet Protocol flow.

In a First Order (FO) state 50 the compressor 10 only sends updates of the static fields to the decompressor 20 to compensate for irregularities in the stream that may corrupt the context. Therefore, in this state, the compressor 10 sends only context updates.

In a Second Order (SO) state 60, the compressor 10 sends compressed headers 12 since it is confident that the decompressor 20 has correctly received a valid context. This is the state in which the compressor 10 should normally operate. Only when stream irregularities are found the compressor 10 goes to the First Order state 50 or even to the Initialization and Refresh state 40.

FIG. 3 shows the decompressor states. The decompressor 20 starts in a "no-context" (NC) state 70. Upon successful decompression of a header, it passes to a "full context" (FC) state 90, which is the normal operating state. Only after repeated failures in decompressing headers, the decompressor 20 passes to a "static context" (SC) state 80, waiting for context update packets (sent by the compressor 10 in the First Order state 40). If a valid context cannot be recovered, the decompressor returns to the "no context" state.

Transitions among states are governed by operating modes. Robust Header Compression defines three operating modes: Unidirectional (U-mode), bi-directional Optimistic (O-mode) and bi-directional Reliable (R-mode).

In the U-mode a feedback channel from the decompressor to the compressor does not exist (or cannot be used) so that transitions between compressor states are only based on periodic timeouts and irregularities in the incoming packet headers; periodic refreshes of the context are needed. In the O-mode, a feedback channel is used for error recovery requests and (optionally) acknowledgements of context updates: the rationale behind this operating mode is to minimize the use of the feedback channel.

Finally, the R-mode makes intensive use of the feedback channel in order to maximize robustness against loss propagation and damage propagation.

Given a header field value v to be compressed, in ROHC a Window-based Least Significant Bit (W-LSB) algorithm is applied that transmits only its least significant bits, provided a suitable reference value v_ref is maintained both at the compressor 10 and at the decompressor 20. In order to avoid mismatches between reference values v_ref, a robust algorithm is defined which selects the reference value v_ref within a Variable Sliding Window (VSW). The number of least significant bits k to transmit for the header field value v to be compressed is selected according to the following relation:

$$f(v\_ref,k)=[v\_ref-p, v\_ref+(2^{k-1})-p] \quad (1)$$

f(v_ref, k) represents an interval in which the header field value v is expected to vary. The offset parameter p can be chosen according to the behavior of the specific field to compress.

Now, at the compressor 10 the number of least significant bits k can be chosen in such a way that:

$$k = g(v\_ref, v) \stackrel{\Delta}{=} \min k: v \in f(v\_ref, k) \quad (2)$$

So k would be the minimum value such that the header field value v falls in the interval f(v_ref, k).

However, this scheme would not be robust against errors because the compressor has no knowledge that the decompressor is using the same reference value (which could actually be different because of transmission errors). Instead, a variable sliding window is introduced:

$$VSW = \{v_{i-w}, v_i\} \quad (3)$$

where w indicates a window size, i.e. the last w values that have been transmitted. Whenever a new value enters the compressor, it is appended to Variable Sliding Window. When the compressor is sufficiently confident that some of the older values in Variable Sliding Window have been correctly received, those values are removed from Variable Sliding Window.

$$v_{min} = \min(VSW), v_{max} = \max(VSW) \quad (4)$$

are the minimum and maximum values in Variable Sliding Window.

In the Window-based Least Significant Bit coding scheme, the selection of the number of least significant bits k is made according to the following formula:

$$k \stackrel{\Delta}{=} \max(g(v, v_{min}), g(v, v_{max})) \quad (5)$$

where function g( ) has been defined in equation (2). In this way, a higher number of bits is used to encode the field due to the uncertainty that the decompressor has a good reference interval for decoding the transmitted m bits.

In fact, the decoding technique at the decompressor is based on the following algorithm.

$$I_d = f(v\_ref\_d, m) \quad (6)$$

v_ref_d is the last correctly decompressed value, m is the number of bits received and Id is the interpretation interval.

The decompressed field is simply derived by picking the value in the above interpretation interval whose m least significant bits match the received m bits.

The size w of the Variable Sliding Window depends on the confidence that the compressor has on the decompressor state, which in turn depends on the selected Robust Header Compression mode. For U and O modes, w is implementation dependent. In R-mode explicit feedback from the decompressor can be used to minimize the sliding window dimension and therefore maximizing the compression ratio.

The Window-based Least Significant Bit algorithm will be now explained by way of a example.

Assuming that the compressor 10 has transmitted the values 151, 152, 153, 154 and 155 and that the last three ones have not been received because of transmission errors on the wireless link, then, at the compressor 10 will be Variable Sliding Window=[151, 152, 153, 154, 155], vmin=151 and vmax=155.

If, now, the value 156 enters the compressor 10, the number of least significant bits k to transmit is given by relation (5), which yields k=max (3,1)=3.

So the last three Least Significant Bits of the value 156-'10011100' are transmitted, i.e. '100'.

At the decompressor 20, since the values 153, 154 and 155 have been lost, the last good reference value is 152.

According to relation (6), the decompressor 20 has thus an interpretation interval Id=[152, 159], which is expanded below in Table 1, where the first column contains the decimal value and the second column contains the corresponding binary value.

TABLE 1

| Dec | Bin |
|-----|-----|
| 152 | 10011000 |
| 153 | 10011001 |
| 154 | 10011010 |
| 155 | 10011011 |
| 156 | 10011100 <<< |
| 157 | 10011101 |
| 158 | 10011110 |
| 159 | 10011111 |

Within this interval the only value whose three Least Significant Bits match the pattern '100' is the number 156.

The correctness of the decompression can be checked by applying a small Cyclic Redundancy Check (CRC) to the original header, from 3 to 8 bits depending on mode, in order to avoid that an undetected transmission error leads to a wrong decompressed value, which, in turn, would be used later as a reference value, leading to damage propagation.

Failure of the Cyclic Redundancy Check to detect a damaged value is also compensated for in the Robust Header Compression framework (see IEFT RFC 3095, "Robust Header Compression (ROHC): Framework and four profiles: RTP, UDP, ESP, and uncompressed", section 5.3.2.2.3).

The Window-based Least Significant Bit coding algorithm is not the only one that is used in the Robust Header Compression framework.

Other schemes exist that take advantage of specific characteristics of some header fields such as, for example, the Realtime Transport Protocol timestamp, which usually increases in regular steps over time (multiple of a TS_STRIDE value).

This characteristic is exploited by "scaled Realtime Transport Protocol timestamp" encoding.

Realtime Transport Protocol timestamp can also be approximated with a linear function of the time of day for traffic generated at constant rate, fixed sampling frequency and when packet generation is locked to the sampling frequency. In this case "timer-based compression of Realtime Transport Protocol timestamp" applies.

The Internet Protocol identification field (IP-ID) is encoded by considering only offsets between the IP-ID and the Realtime Transport Protocol sequence number (the latter increases by one for each new packet) and applying Window-based Least Significant Bit encoding to such offsets.

Constant header fields of the Realtime Transport Protocol/Unreliable Datagram Protocol/Internet Protocol stream to be compressed can be structured as ordered lists. The Robust Header Compression framework provides means to handle such lists in such a way that list items (that form the context) in the decompressor can be flexibly inserted, removed or changed by the compressor.

The dynamic fields of the Realtime Transport Protocol header are encoded according to Table 2.

TABLE 2

| Field | Coding | Comments |
| --- | --- | --- |
| RTP-SN Sequence Number | Window-based Least Significant Bit | $p = 2^{k-5} - 1, k > 4, p = 1$ otherwise |
| IP-ID | Offset IP-ID | Unless IP-ID varies randomly (RND flag $\neq$ 0) |
| RTP-TS Timestamp | Timer-based Scaled RTP TS No compression | Depending on flag values in the header (TS-STRIDE, Tsc) $p = 2^{k-2} - 1$ |
| Cyclic Redundancy Check | 3, 7 or 8 bits | Calculated over the original uncompressed header |
| Marker bit | Only updated when it changes | Context initially set to 0 |

The Realtime Transport Protocol Timestamp and IP-ID fields can often be derived from the Realtime Transport Protocol Sequence Number, since IP-ID usually increases by the same difference or delta as the sequence number and the timestamp by the same delta times a fixed value. Therefore, when these conditions apply, only the Realtime Transport Protocol Sequence Number is included in the compressed header and the functions to derive the other fields are included in the context.

A Robust Header Compression packet has the format shown in Table 3:

TABLE 3

Padding
Feedback
Header
Payload

The first field in the packet of Table 3 is the Padding field and is an optional field with variable length. The second field is the Feedback field that comprises zero or more feedback elements. The third field is the Header field that is Variable, with Context ID information (CID).

Each element of the packet in Table 3, with the exception of the payload, starts with a unique bit pattern.

Headers carry Context ID information: they may include one byte add-Context ID octet (starting with the pattern '1110') for small Context IDs between 1 and 15 or carry embedded Context ID information when the Context ID space is large (up to 2 bytes). Context ID=0 is not transmitted: in that case the packet starts with the packet type, which is a unique bit pattern different from '1110' and a null Context ID is implied.

Feedback information can be piggybacked to any Robust Header Compression packet and carries negative and positive acknowledgements for context updates and header decompression. Feedback packets can also be used by the decompressor, to request transitions between modes (e.g. from U-mode to O-mode).

Several packets types are defined by Robust Header Compression depending on their function, the used mode and which field is carried. The notation for Robust Header Compression packets is:

<Mode>-<Type>-<Optional Fields>.

For example, an UOR-2 packet can be used in U-mode, O-mode or R-mode and is of type 2.

In the Realtime Transport Protocol profile three packet types are used to identify compressed headers and two for initialization and refresh as shown below:

i) (R-0, R-0-CRC, UO-0) this is the minimal packet type where only the W—Window-based Least Significant Bit encoded Realtime Transport Protocol—Sequence Number is transmitted, since all the functions to derive the other fields are known at the decompressor.

ii) (R-1, R-1-ID, R-1-TS, UO-1, UO-1-ID, UO-1-TS) this packet is used when the number of bits needed to encode the Realtime Transport Protocol—Sequence Number exceeds those available in packet type i) or when the functions to derive Realtime Transport Protocol Timestamp and IP-ID from Realtime Transport Protocol Sequence Number change.

iii) (UOR-2, UOR-2-ID, UOR-2-TS) used to change parameters of any Sequence Number—function.

iv) IR: this packet is used to communicate the static part of the context, i.e. the constant Sequence Number functions v) IR-DYN: this packet type is used to communicate the dynamic part of the context, i.e. the non-constant Sequence Number—functions.

The bit patterns that form unique prefixes for each of the packet type are shown in Table 4.

Upon receiving a packet, the decompressor parses the first byte and consequently drives its state machine. The Initialization and Refresh packet allows the decompressor to create a context for the Realtime Transport Protocol/Unreliable Datagram Protocol/Internet Protocol flow. Its structure is shown in Table 5.

TABLE 4

| Packet type | Pattern |
| --- | --- |
| Add-CID | 1110 |
| Padding | 11100000 |
| Feedback | 11110 |
| IR | 1111110 |
| IR-DYN | 11111000 |
| Segment | 1111111 |
| R-0 | 00 |
| R-0-CRC | 01 |
| UO-0 | 0 |
| R-1, R-1-ID, R-1-TS | 10 |
| UO-1, UO-1-ID, UO-1-TS | 10 |
| UOR-2, UOR-2-ID, UOR-2-TS | 110 |

TABLE 5

| 0 | | 7 |
| --- | --- | --- |
| Add-CID octet | | 1 |
| 1111110 | D | 1 |
| CID info (opt.) | | 0-2, large CIDs |
| Profile | | |
| CRC | | |
| Static chain | | variable |
| Dynamic chain | | variable |
| | | Present if D = 1 |
| Payload | | |

The Add—Context ID octet allows associating a context identifier to the static header information that is carried in the rest of the packet.

The D bit is profile specific and, in the case of the Realtime Transport Protocol profile, it indicates the presence of a dynamic sub-header information right after the static chain.

The Context ID info field is present only if big context identifiers need to be used. The profile field is an identifier for the Robust Header Compression profile. An 8-bit Cyclic Redundancy Check follows (see IEFT RFC 3095, "Robust Header Compression (ROHC): Framework and four profiles: RTP, UDP, ESP, and uncompressed", section 5.9.1 for the generator polynomial and on which fields the value is computed).

The static chain contains the ordered list of static header fields.

For example, an IPv4 header should be initialized with a static part that includes: version, protocol, source address and destination address. The dynamic part of the IPv4 header includes: type of service, time to live, Identification, Data Field, Random (RND), Network Byte Order (NBO), extension header list.

The IR-DYN packet is used to update the dynamic part of the context.

TABLE 6

| 0 | 7 |
| --- | --- |
| Add-CID octet (opt.) | |
| 11111000 | 1 |
| 0-2 octets CID info (opt.) | |
| Profile | 1 |
| CRC | 1 |
| Dynamic chain | variable |
| Payload | |

Only the dynamic chain is carried in this case.

The compressed packet format is shown in Table 7. It can be noticed that its structure depends on many conditions (Cx) so that its processing may not be obvious.

TABLE 7

| 0 | 7 |
| --- | --- |
| Add-CID octet (opt.) | |
| Base header | 1 byte, Type indication |
| 0-2 octets CID info (opt.) | |
| Remainder of base header | 1 |
| Extension | Variable, C0 |
| IP-ID outer IPv4 header | 2 bytes, C1 |
| AH data for outer list | Variable |
| GRE checksum | 2 bytes, C2 |
| IP-ID of inner IPv4 header | 2 bytes, C3 |
| AH data for inner list | Variable |
| GRE checksum | 2 bytes, C4 |
| UDP checksum | 2 bytes, C5 |

Conditions depend on values of previously decoded flag fields.

Header extensions may be optionally present to carry additional Robust Header Compression information (four different extension types are defined). An IP-ID field may be present if the context indicates that this field varies randomly.

AH data refers to Authentication Headers, which contain values for security associations. The Generic Routing Encapsulation (GRE) checksum refers to Generic Routing Encapsulation tunnels (RFC2784, RFC2890).

The Unreliable Datagram Protocol checksum is present only when explicitly indicated in the context.

For what concerns the video encoding, the H.264 hybrid video coding standard is known, whose primary goals are improved coding efficiency and improved network adaptation. The syntax of H.264 permits a significant reduction in bit-rate compared to all previous standards such as H.263 and MPEG-4 at the same quality level.

H.264 has been designed for technical solutions including broadcasting services, interactive or serial storage, conversational services, Video on Demand and Multimedia Messaging Services. Moreover, new applications may be deployed over existing and future networks.

To address this need for flexibility and customizability, the H.264 design covers both Video Coding Layer (VCL), which is designed to efficiently represent the video content, and a Network Abstraction Layer (NAL), which formats the Video Coding Layer representation and provides header information in a manner appropriate for conveyance by a variety of transport layers or storage media.

H.264 introduces three new features that impact the motion estimation process.

First, Multiframe Prediction allows using more than one previously decoded frame for forward motion estimation. Second, a precision of one fourth of pixel for motion vectors can be achieved through sub-pixel interpolation.

Moreover, a 16×16 macroblock can be partitioned in seven different ways, and each partition can have its own independent motion vector. This means that up to 16 different motion vectors can be used for a single macroblock, and each of them can be unrestricted, i.e. it can point to a predictor partially lying outside the reference frame.

The bi-directional prediction can also be used, but no more than one single reference frame is allowed to the backward motion estimation, in order to reduce the size of the reorder buffer. Instead, there is no limitation on the number of B frames that can be placed between two anchor frames (even none).

During the motion estimation process, two different cost functions can be used to evaluate the goodness of a predictor.

The first one is named SAD, Sum of Absolute Differences, the second one is SATD, Sum of Absolute Transformed Differences. It is well known that the Sum of Absolute Differences minimization cannot produce a bitstream of minimum size, because the prediction error will be encoded in the frequency domain. This is why H.264 allows to compute the matching error through the Hadamard transform, which is a very simple frequency transform having square waves base functions. In such a way, the transform matrix contains only +1 and −1 values and it can be computed without multiplications.

Furthermore, two different modalities can be applied to choose the best encoding mode for each macroblock: in "low-complexity" mode, the cost function is simply either the above-mentioned Sum of Absolute Differences or Sum of Absolute Transformed Differences, whereas in "high-complexity" mode a rate-distortion optimization is performed by evaluating a Lagrangian functional.

The frequency transform is computed by means of a 16×16 or 4×4 integer transform, having the same statistical properties of the Discrete Cosine Transform (DCT) used by MPEG standards. A 2×2 dedicated transform is applied only to the chrominance components.

Transformed coefficients information is reduced to fit the desired rate through a quantization step, which is also used to vary the strength of a de-blocking loop filter that operates at macroblock level during the coding process.

H.264 allows two ways to perform the variable length coding: CAVLC (Context-Adaptive Variable Length Coding) and CABAC (Context-Adaptive Binary Arithmetic Coding).

The Context-Adaptive Variable Length Coding comprises a combination of adaptive Huffman coding, used to encode residual 4×4 block data, and Exp-Golomb coding, dedicated to the translation of headers in regular code-words. It can be proved that the Huffman method provides an optimal code only if the probability of the symbols are exact powers of 0.5. The Context-Adaptive Binary Arithmetic Coding overcomes this disadvantage by assigning a code to a sequence of symbols, so each symbol can be coded with a fractional number of bits. Adapting the variable length codes to the instantaneous statistical frequency of the symbols further raises the performance.

The coded video data is organized into Network Adaptation Layer (NAL) units, each of which is actually a packet that contains an integer number of bytes. The first byte of each Network Adaptation Layer unit is a header byte that contains an indication of the type of data in the Network Adaptation Layer unit (NALU), and the remaining bytes contain payload data of the type indicated by the header. The Network Adaptation Layer unit structure definition specifies a generic format for use in both packet-oriented and bitstream-oriented transport systems, and a series of Network Adaptation Layer units generated by an encoder is referred to as a Network Adaptation Layer unit stream.

Network Adaptation Layer units are classified into Video Coding Layer and non-Video Coding Layer Network Adaptation Layer units. The Video Coding Layer Network Adaptation Layer units contain the data that represent the values of the samples in the video pictures, and the non-Video Coding Layer Network Adaptation Layer units contain any associated additional information such as parameter sets (important header data that can apply to a large number of Video Coding Layer Network Adaptation Layer units) and supplemental enhancement information (timing information and other supplemental data that may enhance usability of the decoded video signal but are not necessary for decoding the values of the samples in the video pictures).

Sequence and Picture Parameter Sets are necessary (must be correctly delivered by the underlying network) for a correct decoding of the video stream since they contain information that is referenced by every other Video Coding Layer and non-Video Coding Layer NALU.

A slice can be considered as a standalone decoding unit and consists into a set of macroblocks of a given picture. Unlike the rigid slice structure found in MPEG-2 (which reduces coding efficiency by increasing the quantity of header data and decreasing the effectiveness of prediction), slice sizes in H.264/AVC are highly flexible, as was the case earlier in MPEG-1.

Since it is always contained into a Network Adaptation Layer unit, a slice is typically transmitted separately from other ones of the same picture. Then, slicing allows the encoder to arrange information in different independent network units in order to limit the consequence of a transmission failure to a portion instead to the whole picture. Other important features included into the H.264/AVC standard that can be useful for error resilience/concealment purposes are Flexible Macroblock Ordering (FMO) and Data Partitioning.

A new ability to partition the picture into regions called slice groups has been developed, with each slice becoming an independently-decodable subset of a slice group. When used effectively, flexible macroblock ordering can significantly enhance robustness to data losses by managing the spatial relationship between the regions that are coded in each slice.

Since some coded information for representation of each region (e.g., motion vectors and other prediction information) is more important or more valuable than other information for purposes of representing the video content, H.264 allows the syntax of each slice to be separated into up to three different partitions for transmission, depending on a categorization of syntax elements. It is important to point out that H.264 Data Partitioning makes a categorization on different syntax elements within the same picture region, based on the damage that a loss of the slice would produce.

U.S. Pat. No. 6,611,674 describes a method for adjusting video coding parameters, in particular the intra refresh rate, depending on wireless link conditions. However, the link conditions are estimated based only on signal to interference ratio or signal to noise ratio, which represent only link local quality measures. This method has two main drawbacks: i) it may be difficult for an application (video encoder) to retrieve such statistics since these are kept in the modem and ii) there is no way to detect adverse conditions in the remote wireless link.

In U.S. Patent Application Publication No. 20020054578 a cross-layer approach for adapting multimedia streaming resource allocation to varying channel conditions in a 3G Wideband Code Division Multiple Access (W-CDMA) system is described. Such an approach can either minimize distortion or power and specifically targets hybrid delay-constrained Automatic Repeat Request and Forward Error Correction mechanisms that are applied to base layers and enhancements layers of a scalable video stream. In particular, the adaptation of the system consists of a dynamic allocation of bits to source coding and channel coding depending on measured channel conditions. Source coding bitrate is varied using Fine Grained Scalability.

SUMMARY OF THE INVENTION

According to an embodiment of the present invention, a method is provided for adapting the parameters of a video coder to the wireless channel conditions that allows for easy and fast retrieval of channel condition information. By using information available in the header compressor, the video coder can estimate which video packets have been lost in the wireless link and avoid error propagation. Different video packetization strategies are suggested depending on the header compression mode being used.

According to an embodiment of the present invention, a corresponding system, a related network as well as a related computer program product, loadable in the memory of at least one computer and including software code portions for performing the steps of the method of the invention when the product is run on a computer are provided. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

The arrangement described herein proposes a method to exploit information on the link quality derived for example from the header compressor and consequently change video coding parameters in order to optimize video quality at the receiver.

A new method according to an embodiment of the present invention for adapting the parameters of a video coder to the wireless channel conditions, based on feedback coming from a Robust Header Compression compressor, is provided. In fact, Robust Header Compression uses acknowledgement messages, in particular Negative Acknowledgement messages, in case of unsuccessful header reconstruction, which indicates the loss of a packet carrying video payload. Such information can be used by the video coder to trigger proper error recovery techniques.

When applied to a mobile terminal, this technique improves the quality of IP-based video communications even when the peer device does not run an equivalent algorithm.

As far as video coding is concerned, reference is made to emerging H.264 standard ("Draft ITU-T Recommendation and Final Draft International Standard of Joint Video Specification (ITU-T Rec. H.264 | ISO/IEC 14496-10 AVC)"), which has been designed for delivery of packet-based networks. However, the same concept can be applied to other standards as well, like for example MPEG-4.

The method of the present invention thus estimates link quality based only on layer-2 (header compressor) and layer-4 Realtime Transport Protocol information, which are more easily accessible and provide end-to-end quality estimation.

BRIEF DESCRIPTION OF THE DRAWINGS

The invention will now be described, by way of example only, by referring to the enclosed figures of drawing, wherein:

FIG. 1 shows a block diagram of the compression operations;

FIG. 2 shows a block diagram of the compressor states;

FIG. 3 shows a block diagram of the decompressor states;

DETAILED DESCRIPTION OF PREFERRED EMBODIMENTS OF THE INVENTION

The goal of the present arrangement is the optimization of an IP-based video-call application between two terminals, in which at least one of them is a mobile one.

Figure 4:
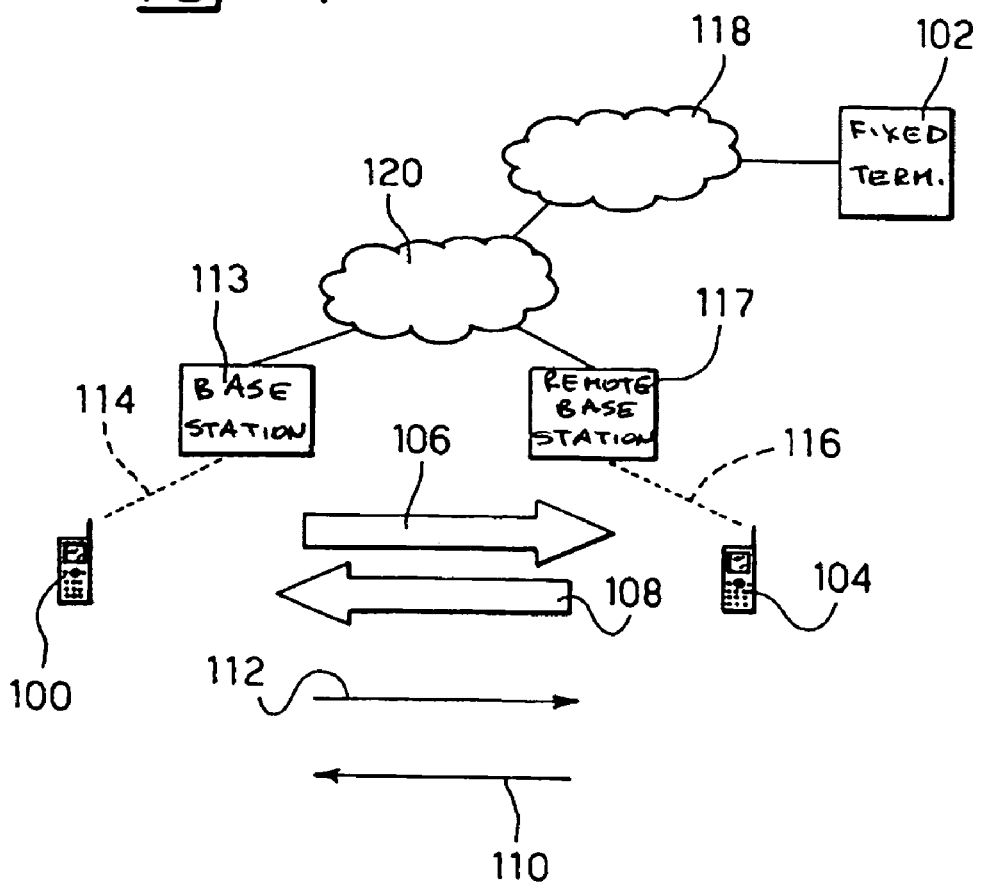
FIG. 4 shows the proposed system architecture.

A system architecture is depicted in FIG. 4 for further reference, where a mobile terminal 100, corresponding to the User Equipment cited in the standard, is shown. Such a mobile terminal 100 communicates through a local link 114 with a base station 113, that in its turn is communication with a controller network 120, according to a typical mobile telecommunication architecture. A further remote mobile terminal 104 is shown, communicating with a remote base station 117 through a remote link 116, and thereby connected to the controller network 120. Also a fixed terminal 102 is shown, that can communicate with the controller network 120 through a Internet network 118.

The video-call application can either run between the mobile terminal 100 and the fixed terminal 102 or between the mobile terminals 100 and 104. The present invention applies to both cases.

Although a Universal Mobile Telecommunications System cellular architecture has been used as a reference, the method described is applicable also to other wireless communication systems, like, for example, General Packet Radio Service—Enhanced Data rates for Global Evolution (GPRS-EDGE) or Wireless LAN (Local Area Network).

If the mobile terminal 100 and the remote mobile terminal 104 are having a bi-directional video-call, they are generating Realtime Transport Protocol flows $RTP_1$ 106 and $RTP_2$ 108 respectively and they receive corresponding Real-time Transport Control Protocol $RTCP-RR_1$ Receiver Reports (RR) message, indicated with the arrow 110 in FIG. 4, and $RTCP-RR_2$ Receiver Reports message, indicated with the arrow 112, in the reverse direction. Each Real-time Transport Control Protocol Receiver Reports message carries statistical information such as lost packets and jitter. Mobile terminals 100 and 104 compress Realtime Transport Protocol packet headers on the wireless link according to the Realtime Transport Protocol/Unreliable Datagram Protocol/Internet Protocol profile.

From the point of view of the local mobile terminal 100, the goal is optimizing the $RTP_1$ flow 106 to the remote mobile terminal 104, on the basis of the conditions of the links, composing a wireless channel, that such $RTP_1$ flow 106 must cross, i.e. the local link 114 and the remote link 116 and possibly the Internet 118.

There may be critical conditions (Radio Frequency nulls, high Bit Error Rate, interference . . . ) in the local link 114, remote link 116 or both. Furthermore, there may be congestion in the core Internet 120.

Consequently, different ways of detecting such conditions at the mobile terminal 100, are defined as shown in Table 8.

TABLE 8

| Error link | Detection technique | Responsiveness |
|---|---|---|
| Local link 114 | ROHC feedback (NACKs) | Immediate |
| Remote link 116 | $RTCP-RR_1$ messages | Slow |
| Local and remote link (all) | Combinations of the above | |

The terminal that is transmitting video, i.e. the local mobile terminal 100, can detect a critical condition in the local wireless link 114 with the base station 113, by the reception of Negative Acknowledgement generated by the Robust Header Compression decompressor in the Universal Terrestrial Radio Access radio network controller.

The Robust Header Compression decompressor (using the optimistic or reliable mode) generates a Negative Acknowledgement (NACK) message when a number of the Cyclic Redundancy Check of the received compressed headers fail and the Realtime Transport Protocol headers cannot be correctly reconstructed.

The rate of reception of Robust Header Compression Negative Acknowledgement messages can be used by the local mobile terminal 100 to: i) detect a generic critical condition in the local wireless link and ii) keep track of which video packets have been lost.

The second case is especially important because such information can be fed back to the video encoder to prevent error propagation at the receiver.

In order to detect that the link of the receiver, i.e. the remote mobile terminal 104, is experiencing packet losses, Real-time Transport Control Protocol Receiver Reports messages may be used, which explicitly include a packet loss rate indication. The responsiveness depends on the total bandwidth allocated to the Realtime Transport Protocol flow. Indeed, it is specified (RFC 3550) that the fraction of the session bandwidth for Real-time Transport Control Protocol is 5%.

The Robust Header Compression framework, as previously mentioned, supports multiple operating modes, based on the presence and utilization of a feedback channel from the header decompressor back to the header compressor.

Although the methods described hereafter refer to Robust Header Compression profile 1 (Realtime Transport Protocol/ Unreliable Datagram Protocol/Internet Protocol), the same concepts can also be applied to other Robust Header Compression profiles, for example Transport Control Protocol/ Internet Protocol.

When operating in optimistic mode, the Robust Header Compression framework minimizes the feedback channel usage. The decompressor in full context state (which should be the normal operating mode after an initial set-up phase) sends a Negative Acknowledgement packet back to the compressor when all the following conditions are verified:

a Cyclic Redundancy Check fails,

Sequence Number Least Significant Bit wraparound correction fails, and

Local context repair fails.

In case of many consecutive packets being lost there is a high probability of a context damage and consequent Negative Acknowledgement generation. In O-mode the window size w is 16 for the coded Realtime Transport Protocol— Sequence Number values (when UO-0 packets are used); therefore any link outage that causes the loss of at least 16 packets is likely to trigger a Negative Acknowledgement.

This observation suggests that application data should be segmented into a higher number of packets in order to improve loss detection capability, at the cost of slightly reduced compression efficiency. Such a penalty is limited when using small Context ID space and UO-0 packets, leading to a minimum header dimension of only one or two bytes.

Figure 5:
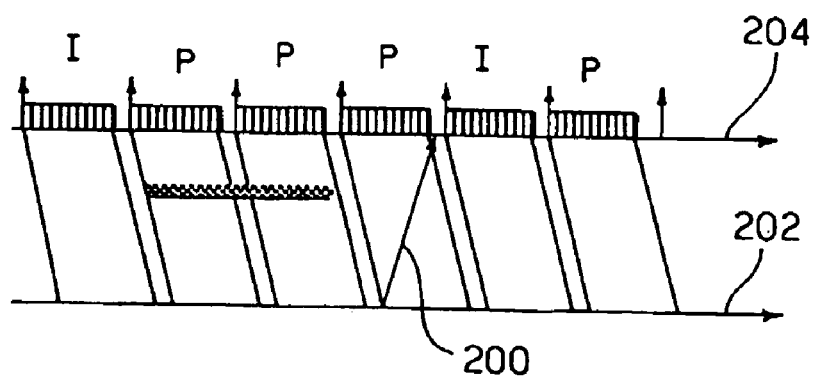
FIG. 5 shows the sequence diagram of optimistic mode packet loss detection.

FIG. 5 shows an example of the operation of a compressor 204 and a decompressor 202 according to the invention.

The compressor 204 sends a sequence of P (prediction) frames and I (Intra) frames. Once the compressor 204 receives a Negative Acknowledgement 200 it transits to a lower state and sends suitable packets to update the context (UOR-2, IR-DYN or IR). As can be seen from FIG. 5, this corresponds to sending I frames. Such packets further reduce compression efficiency, but they are necessary to re-establish a valid context at the decompressor 202 after a prolonged link outage.

If the Robust Header Compression decompressor 202 informs the video encoder about the packet loss event, suitable techniques can be used to mitigate video quality degradation at the receiver.

It should be noted, however, that the decompressor 202 may be able to recover damaged context information without sending a Negative Acknowledgement 200, so the optimistic mode does not guarantee 100% packet loss detection.

The video coder is operating at 10 frames per second and generates 10 packets per frame (with a variable dimension depending on frame type I or P).

In these conditions a burst of errors affecting at least 16 packets (~160 ms on average) will cause the decompressor 202 to transmit a Negative Acknowledgement packet 200 (Robust Header Compression feedback-2 packet, 2 bytes minimum). Upon receiving such Negative Acknowledgement indication 200, the Robust Header Compression compressor 204 informs the video encoder, which triggers an Intra-refresh 212 operation.

In Reliable mode, the Robust Header Compression framework uses the feedback channel more frequently: acknowledgement packets are transmitted whenever the context is successfully updated.

Figure 6:
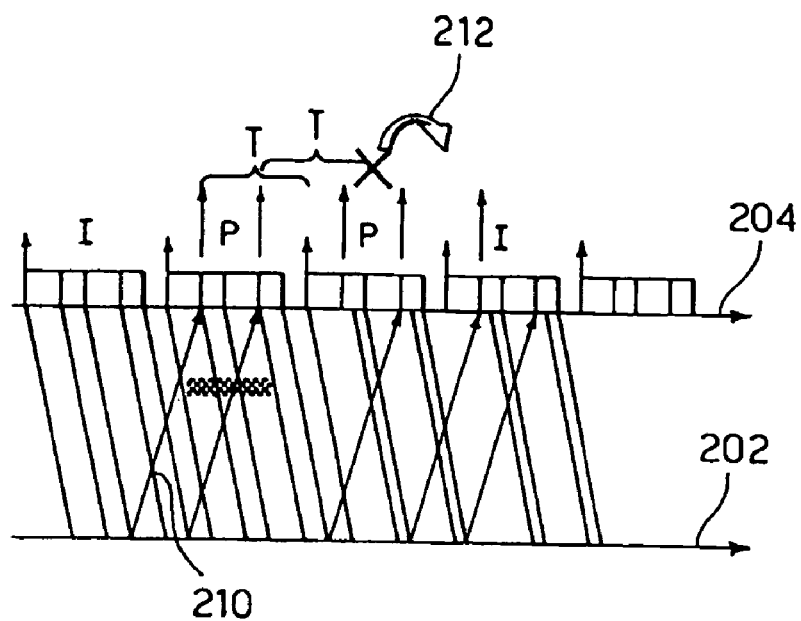
FIG. 6 shows the sequence diagram of reliable mode packet loss detection.

In particular, in FIG. 6 the Robust Header Compression decompressor 202 generates an Acknowledge (ACK) message 210 (Robust Header Compression feedback-1 packet, one byte minimum) in the following cases:

the first of a sequence of R-0-CRC packets is correctly decompressed;

the first N packets out of a sequence of UOR-2, IR or IR-DYN packets are successfully decompressed, where the default value for N is 2.

The decompressor 202 should ensure that at least one Acknowledge packet 210 per round trip time is generated, whereas the "sparse Acknowledge" mechanism tries to reduce the number of Acknowledges that are generated.

The Acknowledge packet 210 carries the Sequence Number of the packet that triggered the Acknowledge event.

In this case, preferably larger packets (that update the Robust Header Compression context) should be used in order to force the decompressor 202 to generated Acknowledge packets 210, at the cost of a higher radio bandwidth used for this purpose.

The transmitting side can therefore use two strategies to detect packet loss and consequently take countermeasures in the video encoder.

First, it can track the Robust Header Compression Acknowledge inter-arrival rate and, based on the measured average and variance, set a timeout T. This timeout T is set each time a Robust Header Compression Acknowledge is received. Upon timeout expiration, the transmitter assumes that the Acknowledge has not been generated due to a packet loss.

Second, the transmitter side keeps track of Sequence Numbers of Acknowledge packets (these sequence numbers are carried in the Robust Header Compression Acknowledge packet) and can easily detect gaps.

Whenever packet loss is detected by using the ROHC framework, the video encoder can react to mitigate video quality degradation, as discussed below.

Conversational services are mainly characterized by the fact that the end-to-end delay should be less than 150 ms, which leads to unavoidable transmission errors. Thus, an error-resilient video coding standard suitable for conversational communication has to minimize the visual effect of errors within one frame, whereas at the same time the well-known problem of spatial-temporal error propagation has to be limited.

H.264 video encoding is based on sequential encoding of N frames. Moreover, within each frame video encoding is based on sequential encoding of M macroblocks, where M is the total number of macroblocks in one frame and depends on the spatial resolution of the video sequence.

The encoding process then creates slices by grouping a certain number of macroblocks, the picture and macroblock indexes being binary coded in the slice header. The coded representation of a slice is the payload of a Network Adaptation Layer unit, which in turn is encapsulated in a Realtime Transport Protocol packet.

Sliced-structured coding is an error resiliency tool that helps in reducing packet loss probability and the corresponding visual degradation.

Packet loss probability can be reduced if slices are relatively small, since the probability of bit errors is generally lower than for large packets.

Moreover, short packets reduce the amount of lost information, so that error concealment techniques can be applied more efficiently, although it has to be considered that the increased overhead associated with decreasing slice size might affect coding performance. Thus, careful selection of the packet size is necessary.

At the receiving side, the decoder is in charge of temporal and spatial localization of lost packets i.e., error detection. In particular, the decoder has to detect if an entire picture or one or more slices of a picture were lost. This can be done by checking frame and macroblock indexes in slice headers.

Once errors have been detected, error concealment tools may be applied by means of pixel-level processing techniques. For example, supposing that a macroblock has not been received, it can be concealed from the pixel values of spatially adjacent macroblocks.

The need also exists of taking into account that error resiliency, error detection and error concealment techniques may help in reducing the impact of errors on the video quality. However, since errors cannot be completely eliminated, the effects of spatial-temporal propagation may still become severe.

Considering a given macroblock $MB_A$ of frame (n−1), and supposing that the set of macroblocks belonging to frame n and predicted from pixels of such given macroblock $MB_A$ is given by a set $\{MB_j\}$, j=1, . . . , k, and further supposing that the given macroblock MBA has not been received because of packet loss during transmission of frame (n−1), the decoder cannot then decode this macroblock, and error concealment is applied to estimate the given macroblock MBA. However, such reconstruction leads to mismatches of the reference frame (n−1) between encoder and decoder. Thus, decoding of frame n causes the set $\{MB_j\}$ to suffer from error propagation.

If no information on missing macroblocks is available at the encoder, the only effective way to recover from error propagation is refreshing by coding Intra frames, although it must be taken into account that the instantaneous bit-rate and the resulting delay would increase significantly.

On the other hand, if the encoder knows which macroblocks of frame (n−1) have been lost during transmission, error propagation can be avoided by forcing those macroblocks not to be used for prediction of macroblocks of frame n.

For each macroblock belonging to frame n, the encoder may then decide to use Inter or Intra coding according to efficiency considerations (H.264 allows Intra encoding of single macroblock). The only difference compared to usual frame coding is that here frame (n−1), which is used as the reference frame to encode frame n, contains "forbidden macroblock" meaning that they cannot be used for prediction.

Information about missing macroblocks is usually available at the decoder side. Indeed, as explained above, error detection allows knowing which slices are missing. This implies that:

a feedback channel is necessary in order to let the decoder sending the encoder a not-acknowledge message (Acknowledge) for missing slices, the encoder receives Acknowledges on parts of frame n-d, where d is a delay which depends on the bandwidth available for the feedback channel.

A far as the second item is concerned, error tracking techniques have to be adopted by the encoder. The encoder attempts to track the error to obtain an estimate of the quality of frame n−1 at the decoder side, which serves as reference for frame n, so that proper error recovery to stop error propagation may be applied.

The Negative Acknowledgement sent by the Robust Header Compression decompressor located in the Universal Terrestrial Radio Access Radio Network Controller can be beneficially used to get information about macroblocks that have been lost with Realtime Transport Protocol packets transmitted in the local link. To do that, it is sufficient to create a map of macroblocks contained in each Realtime Transport Protocol packet.

Such a procedure involving support of the feedback channel is—not—known from H.264 standard. Moreover, its full support would not be possible with current transport and control protocols.

The proposal is thus made of exploiting Third Generation Partnership Project from Rel. 4 supports Robust Header Compression on Universal Mobile Telecommunications System networks so that the proposed technique is fully standard compliant and no modifications are required.

Another important aspect is that the Negative Acknowledgement from the Robust Header Compression decompressor may be much faster than the Negative Acknowledgement sent by the decoder through a possible differently built feedback channel. When this application-level feedback is available, it is obviously possible to combine it with ROHC feedback.

In particular, supposing that after the encoder has encoded frame (n−1), the corresponding Realtime Transport Protocol packets are transmitted from the mobile terminal 100 to the base station 113, when the last Realtime Transport Protocol packet has been sent, the video encoder starts encoding frame n.

It is observed that, if Negative Acknowledgements related to Realtime Transport Protocol packets of frame (n−1) are received before the encoder starts encoding frame n, no error tracking is needed to estimate frame (n−1) at the decoder side. The encoder has just to set forbidden macroblocks as described above in order to avoid error propagation.

In absence of a feedback channel, the encoder has no information about lost packets on the remote link. Thus, it is not possible to apply macroblock-based error recovery techniques, unless a feedback channel is available providing information on lost macroblocks. However, as explained previously, it is to be taken into account that this would not be a standard-compliant solution.

Therefore, Intra frame refreshing should be applied to recover from error propagation when bad quality occurs in the remote link.

The reverse video flow that is being generated by the peer mobile terminal may be used to estimate the quality of the remote link. To do that, Realtime Transport Control Protocol Receiver Report messages of the reverse video flow, which explicitly include an Realtime Transport Protocol packet loss rate indication may be used, although the rate of generation of such reports is low.

In particular, the link quality estimation strategy summarized in Table 9 can be adopted.

TABLE 9

|  | RTP packet loss (remote) | No RTP packet loss (remote) |
| --- | --- | --- |
| ROHC NACK occurrence (local) | Bad local link, and bad remote link depending on RTP packet loss rate | Bad local link |
| No ROHC NACK occurrence (local) | Bad remote link | Good local and remote link |

Figure 7:
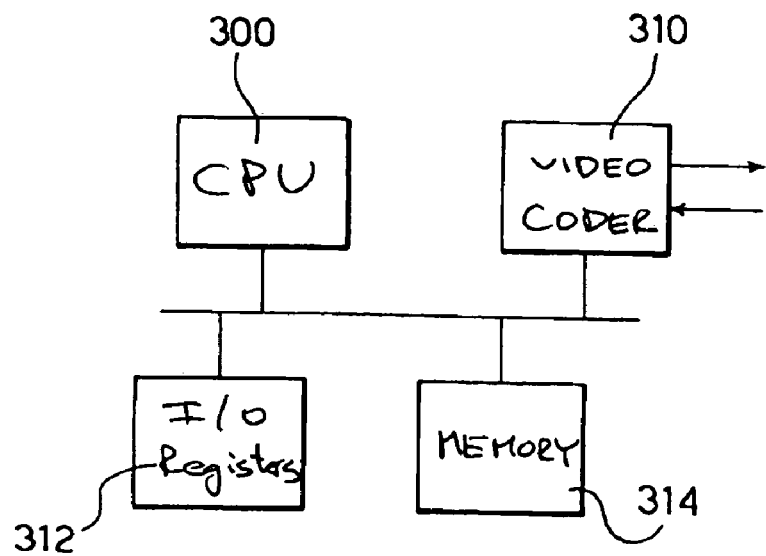
FIG. 7 shows a block diagram of a mobile phone suitable for implementing the proposed method.

A preferred embodiment of the present invention may be implemented in future mobile phones according to the schematics shown in FIG. 7, for example on next-generation Nomadik platforms.

Such a preferred embodiment basically provides for a procedure that runs in a main Central Process Unit 300 of the mobile phone and interacts with a video coder 310, which is usually implemented as a hardware accelerator. Such Central Process Unit 300 interacts with the video codec 310 by means of I/O registers 312, shared memory 314 and interrupts.

All the networking tasks (protocol stacks) run on the Central Process Unit 300 including the Robust Header Compression engine. Based on the detected link conditions, the video coder 310 parameters are dynamically written in its control registers.

Thus, in embodiments of the present invention, a corresponding system, a related network as well as a related computer program product, loadable in the memory of at least one computer and including software code portions for performing the steps of the method of the invention when the product is run on a computer are provided. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

One embodiment of a related computer program product comprises a computer readable medium encoded with computer executable instructions for performing at a terminal compression of said video data in packets during a video coding operation, detecting wireless channel conditions and configuring control parameters of said video coding operation to said detected channel conditions, wherein said compression operation is a robust header compression operation and said configuring control parameters of said video coding operation is performed as a function of information about said wireless channel conditions detected on a feedback channel made available in a decompression operation associated with said compression operation.

A method for dynamically adapting video encoding characteristics in an IP-based mobile video call system has thus been presented that improves the received video quality in presence of varying wireless link conditions.

By exploiting information from the Realtime Transport Protocol/Unreliable Datagram Protocol/Internet Protocol header compressor and by analyzing the reverse video stream, the terminal is able to adapt the video encoder parameters to the estimated channel conditions and therefore limit error propagation which degrades video quality.

The arrangement described herein can be used also in other contexts where IP-based video services are provided and RoHC is applicable. For instance, it can be used in EDGE (Enhanced Data Rates for GSM Evolution (EDGE)) or other CDMA mobile standards.

Consequently, without prejudice to the underlying principles of the invention, the details and the embodiments may vary, also appreciably, with reference to what has been described by way of example only, without departing from the scope of the invention as defined by the following claims.

We claim:

1. A method for communicating video data on a channel in a packet-switched network comprising:
    performing, by a terminal, compression of said video data in packets during a video encoding operation; and
    detecting wireless channel conditions and configuring control parameters of said video encoding operation to said detected wireless channel conditions, wherein said encoded video data compression operation is a robust header compression operation and said configuring control parameters of said video encoding operation is performed as a function of information about said wireless channel conditions detected on a feedback channel made available in an encoded video data decompression operation associated with said encoded video data compression operation,
    wherein said compression operation includes a second mode of operation in which a robust header compression acknowledge message is generated when a first of a sequence of R-0-CRC packets is correctly decompressed or when the first N packets of a sequence of UOR-2, IR or IR-DYN packets are successfully decompressed, said robust header acknowledge message carrying a sequence number of the packet that caused its generation, and said configuring the control parameters of the video coding operation comprises detecting packet loss by tracking the robust header compression acknowledge message inter-arrival rate and setting a timeout (T) depending from said inter-arrival rate parameters, said timeout (T) being set each time a robust header compression acknowledge message is received and said acknowledge message does not indicate a packet loss upon timeout expiration.

* * * * *